(12) United States Patent
Kim

(10) Patent No.: US 12,534,058 B2
(45) Date of Patent: Jan. 27, 2026

(54) SYSTEM AND METHOD FOR DETECTING BRAKE FLUID LEAKAGE

(71) Applicant: HL MANDO CORPORATION, Pyeongtaek-si (KR)

(72) Inventor: Jisoo Kim, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 294 days.

(21) Appl. No.: 18/372,872

(22) Filed: Sep. 26, 2023

(65) Prior Publication Data
US 2024/0239326 A1    Jul. 18, 2024

(30) Foreign Application Priority Data
Jan. 12, 2023    (KR) ................ 10-2023-0004751

(51) Int. Cl.
*B60T 17/22*    (2006.01)

(52) U.S. Cl.
CPC ........... *B60T 17/22* (2013.01); *B60T 2220/04* (2013.01); *B60T 2220/06* (2013.01); *B60T 2250/04* (2013.01); *B60T 2270/406* (2013.01)

(58) Field of Classification Search
CPC .. B60T 17/22; B60T 2220/04; B60T 2250/04; B60T 2270/406
See application file for complete search history.

(56) References Cited

FOREIGN PATENT DOCUMENTS

CN    115583233 A  *  1/2023   .............. B60T 17/22
DE    112019006046 T5 * 10/2021  ............ B60T 13/686

* cited by examiner

*Primary Examiner* — Jamel E Williams
(74) *Attorney, Agent, or Firm* — Harvest IP Law, LLP

(57) ABSTRACT

The present disclosure relates to a system and method of detecting a brake fluid leakage for detecting whether a brake fluid of a vehicle is leaking and a position of the leakage. The method of detecting a brake fluid leakage according to an embodiment of the present disclosure includes detecting a level of the brake fluid stored, detecting whether the vehicle is braking, and diagnosing whether the brake fluid is leaking and the position of the leakage when the level of the brake fluid falls below a reference level and a state of the vehicle is detected as a non-braking state.

20 Claims, 4 Drawing Sheets

SYSTEM AND METHOD FOR DETECTING BRAKE FLUID LEAKAGE

CROSS-REFERENCE TO RELATED APPLICATIONS

This application claims benefit and priority to Korean Patent Application No. 10-2023-0004751, filed on Jan. 12, 2023, with the Korean Intellectual Property Office, the disclosure of which is incorporated herein in its entirety by reference.

TECHNICAL FIELD

The present disclosure relates to a system and method for detecting brake fluid leakage for detecting whether the brake fluid of a vehicle is leaking and a position of leakage.

BACKGROUND

A hydraulic brake in a vehicle generates hydraulic pressure for braking from a master cylinder when a brake pedal is stepped on, which is then sent to wheel cylinders or calipers, which receive the hydraulic pressure and actuate brake shoes or brake pads to generate a braking force.

While such a hydraulic brake applies the same braking force to all wheels and has low friction losses, a braking function of the hydraulic brake is lost when a brake line in a hydraulic circuit breaks and brake fluid leaks.

On the other hand, when a driver brakes a vehicle and a leak occurs in the brake line through which brake fluid flows, such as a pipe or tube of the hydraulic brake, due to abnormal factors, a loss of brake pressure occurs in an area where the leak occurs, causing the brake pressure on the wheel to decompress to the level of atmospheric pressure. When such a decompression phenomenon occurs, the braking force required by the driver is not secured, and eventually the braking distance increases due to the lack of braking force, thus causing a risk of exceeding the driver's expected braking distance.

In order to improve these problems, in the related art, brake fluid level detection sensors or pressure sensors that measure pressure in the master cylinder and wheel cylinders are additionally installed, and a leakage of brake fluid is detected and warned to the driver based on the sensor information.

In the related art, the amount of brake fluid leakage is monitored by shutting off each hydraulic circuit that is responsible for supplying brake fluid to each wheel during braking. That is, the amount of brake fluid outflow from each hydraulic circuit was compared based on a difference between a pressure value measured by a pressure sensor and an estimated pressure value calculated based on a position of a piston reciprocating a cylinder to detect whether and where the brake fluid leaks.

However, the method in the related art as described above is only available when the vehicle is about to enter a braking cycle. Therefore, there is a problem in that a small brake fluid leak in the non-braking state of the vehicle is not only undetectable, but also causes a loss of braking force when braking.

SUMMARY

The present disclosure has been made in an effort to provide a system and method for detecting a brake fluid leakage that is capable of detecting whether a small amount of the brake fluid is leaking and a position of the leakage in a non-braking state of the vehicle.

According to exemplary embodiment of the present disclosure, a system for detecting a brake fluid leakage in a vehicle and a position of the leakage, includes: a storage tank configured to store brake fluid; a level sensor configured to detect a level of the brake fluid stored in the storage tank; a braking state detection means configured to detect whether the vehicle is braking; a first brake circuit provided to brake some of wheels of a plurality of wheels, and comprising a first wheel injection valve to control an inflow of the brake fluid; a second brake circuit provided to brake the other wheels of the plurality of wheels, and comprising a second wheel injection valve to control an inflow of the brake fluid; and a control device configured to detect whether the brake fluid is leaking and the position of the leakage by closing the first wheel injection valve and generating a predetermined brake pressure in the second brake circuit to monitor an amount of outflow of the brake fluid, or by closing the second wheel injection valve and generating a predetermined brake pressure in the first brake circuit to monitor the amount of outflow of the brake fluid when the level of the brake fluid stored in the storage tank falls below a reference level, and a state of the vehicle is detected as a non-braking state.

The predetermined brake pressure may be generated in a small amount without affecting the driver's control of the vehicle.

The braking state detection means may detect an amount of depression of an accelerator pedal, and the control device may determine the state of the vehicle as the non-braking state when the amount of depression of the accelerator pedal exceeds a predetermined ratio.

The braking state detection means may detect a distance by which a brake pedal is depressed, and the control device may determine that the vehicle is in the non-braking state when the distance by which the brake pedal is depressed is less than a predetermined distance.

The braking state detection means may detect a speed of the vehicle, and the control device may determine that the vehicle is in the non-braking state when the speed of the vehicle exceeds a predetermined speed.

The control device may monitor the amount of outflow of the brake fluid for the first brake circuit and sequentially monitor the amount of outflow of the brake fluid for the second brake circuit, or, conversely, monitor the amount of outflow of the brake fluid for the second brake circuit and sequentially monitor the amount of outflow of the brake fluid for the first brake circuit.

The control device may shut off a supply of the brake fluid to the first brake circuit and generate a predetermined brake pressure in the second brake circuit to monitor the amount of outflow of the brake fluid, and diagnose that a leakage has occurred in the second brake circuit when the amount of outflow of the brake fluid is above a predetermined reference amount.

The control device may monitor the amount of outflow of the brake fluid by shutting off the supply of the brake fluid to the first brake circuit and generating a predetermined brake pressure in the second brake circuit, when the amount of outflow of the brake fluid is less than a predetermined reference amount, compare a brake fluid outflow rate of the second brake circuit with a brake fluid outflow rate of the first brake circuit, consider that the brake fluid outflow rate in the first brake circuit is normal, and when the brake fluid outflow rate of the second brake circuit is greater than the brake fluid outflow rate of the first brake circuit, diagnose that a leakage has occurred in the second brake circuit.

The control device may shut off a supply of the brake fluid to the second brake circuit and generate a predetermined brake pressure in the first brake circuit to monitor the amount of outflow of the brake fluid, and diagnose that a leakage has occurred in the first brake circuit when the amount of outflow of the brake fluid is above a predetermined reference amount.

The control device may monitor the amount of outflow of the brake fluid by shutting off the supply of the brake fluid to the second brake circuit and generating a predetermined brake pressure in the first brake circuit, when the amount of outflow of the brake fluid is less than a predetermined reference amount, compare a brake fluid outflow rate of the first brake circuit with a brake fluid outflow rate of the second brake circuit, consider that the brake fluid outflow rate in the second brake circuit is normal, and when the brake fluid outflow rate of the first brake circuit is greater than the brake fluid outflow rate of the second brake circuit, diagnose that a leakage has occurred in the first brake circuit.

According to an embodiment of the present disclosure, a method of detecting a brake fluid leakage includes detecting a level of brake fluid stored, detecting whether the vehicle is braking, and diagnosing whether the brake fluid is leaking and a location of the leakage when a level of the brake fluid falls below a reference level and a state of the vehicle is detected as a non-braking state. The diagnosing of whether the brake fluid is leaking and the position of the leakage includes: monitoring an amount of outflow of the brake fluid by shutting off a supply of the brake fluid to a first brake circuit for braking some of wheels of a plurality of wheels, and generating a predetermined brake pressure in the second brake circuit for braking the other wheels of the plurality of wheels; monitoring the amount of outflow of the brake fluid by shutting off a supply of the brake fluid to the second brake circuit for braking the other wheels of the plurality of wheels, and generating a predetermined brake pressure in the first brake circuit for braking some of wheels of the plurality of wheels; and diagnosing whether the brake fluid is leaking and the position of the leakage by analyzing results of the monitoring of the amount of outflow of the brake fluid.

The predetermined brake pressure may be generated in a small amount without affecting the driver's control of the vehicle.

Whether the vehicle is braking may be determined by an amount of depression of an accelerator pedal, and a state of the vehicle may be determined as a non-braking state when the amount of depression of the accelerator pedal exceeds a predetermined ratio.

Whether the vehicle is braking may be determined by a distance by which a brake pedal is depressed, and a state of the vehicle may be determined as a non-braking state when the distance by which the brake pedal is depressed is less than a predetermined distance.

Whether the vehicle is braking may be determined by a speed of the vehicle, and a state of the vehicle may be determined as a non-braking state when the speed of the vehicle exceeds a predetermined speed.

The amount of outflow of the brake fluid for the first brake circuit may be monitored and the amount of outflow of the brake fluid for the second brake circuit may be sequentially monitored, or, conversely, the amount of outflow of the brake fluid for the second brake circuit may be monitored and the amount of outflow of the brake fluid for the first brake circuit may be sequentially monitored.

A supply of the brake fluid to the first brake circuit may be shut off and a predetermined brake pressure in the second brake circuit may be generated to monitor the amount of outflow of the brake fluid, and when the amount of outflow of the brake fluid is above a predetermined reference amount, a diagnosis may be made that a leakage has occurred in the second brake circuit.

The amount of outflow of the brake fluid may be monitored by shutting off the supply of the brake fluid to the first brake circuit and generating a predetermined brake pressure in the second brake circuit, when the amount of outflow of the brake fluid is less than a predetermined reference amount, a brake fluid outflow rate of the second brake circuit may be compared with a brake fluid outflow rate of the first brake circuit, the brake fluid outflow rate in the first brake circuit may be considered as normal, and when the brake fluid outflow rate of the second brake circuit is greater than the brake fluid outflow rate of the first brake circuit, a diagnoses may be made that a leakage has occurred in the second brake circuit.

A supply of the brake fluid to the second brake circuit may be shut off and a predetermined brake pressure in the first brake circuit may be generated to monitor the amount of outflow of the brake fluid, and when the amount of outflow of the brake fluid is above a predetermined reference amount, a diagnosis may be made that a leakage has occurred in the first brake circuit.

The amount of outflow of the brake fluid may be monitored by shutting off the supply of the brake fluid to the second brake circuit and generating a predetermined brake pressure in the first brake circuit, when the amount of outflow of the brake fluid is less than a predetermined reference amount, a brake fluid outflow rate of the first brake circuit may be compared with a brake fluid outflow rate of the second brake circuit, the brake fluid outflow rate in the second brake circuit may be considered as normal, and when the brake fluid outflow rate of the first brake circuit is greater than the brake fluid outflow rate of the second brake circuit, a diagnoses may be made that a leakage has occurred in the first brake circuit.

According to the exemplary embodiments of the present disclosure, a system and method for detecting brake fluid leakage can effectively detect whether a small amount of brake fluid is leaking and a position of the leakage in the non-braking state of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
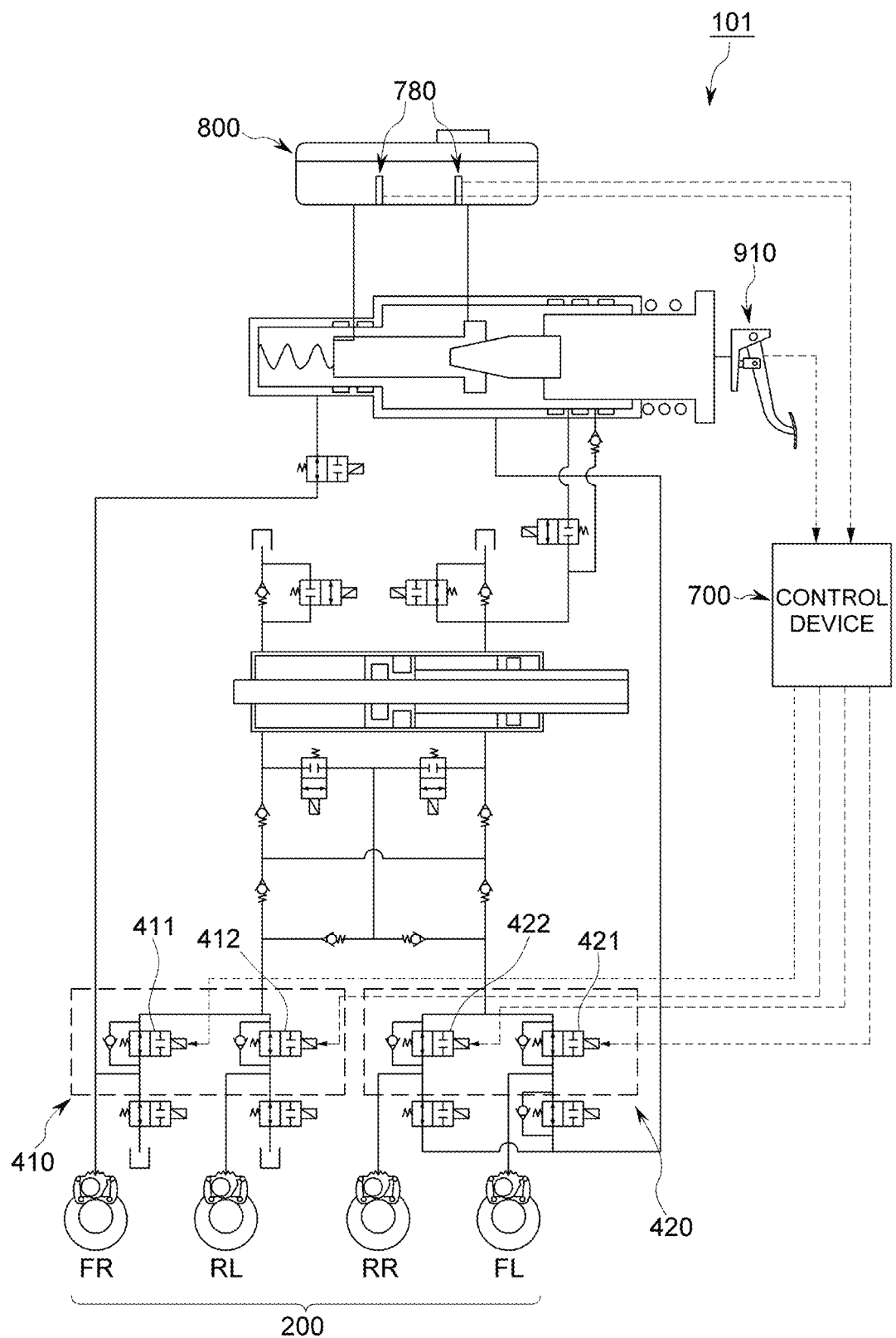
FIG. 1 is a view illustrating a system for detecting brake fluid leakage, according to an embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways, and is not limited to the embodiments described herein.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

Embodiments of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Unless otherwise defined, all technical and scientific terms used in the present specification have meanings generally understood by those skilled in the art to which the present disclosure pertains. All terms used in the present specification are selected for the purpose of more clearly explaining the present disclosure but not selected to restrict the scope of the present disclosure.

The expressions "include," "provided with," "have" and the like used in the present specification should be understood as open-ended terms connoting the possibility of inclusion of other embodiments unless otherwise mentioned in a phrase or sentence including the expressions.

A singular expression can include the meanings of the plurality unless otherwise mentioned, and the same applies to a singular expression stated in the claims.

The terms "first," "second," and the like used in the present specification are used to identify a plurality of constituent elements from one another and are not intended to limit the order or importance of the relevant constituent elements.

Hereinafter, with reference to FIG. 1, a system 101 for detecting a brake fluid leakage will be described according to an embodiment of the present disclosure.

A hydraulic brake to stop a vehicle generates hydraulic pressure for braking from a master cylinder when a brake pedal is stepped on, which is then sent to wheel cylinders or calipers, which receive the hydraulic pressure and actuate brake shoes or brake pads to generate a braking force.

The system 101 for detecting a brake fluid leakage, according to an embodiment of the present disclosure, may detect whether a brake fluid used to generate hydraulic pressure in a hydraulic brake is leaking and a position of the leakage.

As illustrated in FIG. 1, the system 101 for detecting brake fluid leakage according to an embodiment of the present disclosure includes a storage tank 800, a level sensor 780, braking state detection means 910, a first brake circuit 410, a second brake circuit 420, and a control device 700.

The storage tank 800 stores a brake fluid for use in a hydraulic brake. That is, the hydraulic brake generates pressure with the brake fluid stored in the storage tank 800 to secure a braking force. And when the brake fluid leaks, a level of the brake fluid stored in the storage tank 800 is lowered.

The level sensor 780 detects the level of the brake fluid stored in the storage tank 800 and transmits detected information to the control device 700, which will be described later.

The braking state detection means 910 detects whether the vehicle is braking. That is, the braking state detection means 910 detects whether the current state of the vehicle is a braking state or a non-braking state.

In an embodiment of the present disclosure, the braking state detection means 910 may be configured in a variety of ways.

For example, the braking state detection means 910 may detect an amount of depression of an accelerator pedal. That is, the braking state detection means 910 may be an angle sensor that measures an angle of the accelerator pedal. Further, the control device 700, which will be described later, may determine a state of the vehicle as a non-braking state when the amount of depression of the accelerator pedal detected by the braking state detection means 910 exceeds a predetermined ratio. Here, the predetermined ratio may be 3%, for example.

In another example, the braking state detection means 910 may detect a distance by which the brake pedal is depressed. That is, the braking state detection means 910 may be a position sensor that measures a position of the brake pedal. Furthermore, the control device 700, which will be described later, may determine that the state of the vehicle is the non-braking state when the distance by which the brake pedal is depressed detected by the braking state detection means 910 is less than a predetermined distance. Here, the predetermined distance may be 3 mm, for example.

In another example, the braking state detection means 910 may detect a speed of the vehicle. That is, the braking state detection means 910 may be a speed sensor that detects a speed of the vehicle. Furthermore, the control device 700, which will be described later, may determine the state of the vehicle as the non-braking state when the speed of the vehicle detected by the braking state detection means 910 exceeds a predetermined speed. Here, the predetermined speed may be 60 km/h, for example.

The first brake circuit 410 is provided to brake some of wheels FR and RL of a plurality of wheels 200.

For example, the first brake circuit 410 includes first wheel injection valves 411 and 412 that control an inflow of brake fluid to wheel cylinders or calipers for braking a front right wheel (FR) and a rear left wheel (RL), respectively. That is, the first brake circuit 410 may include the first wheel injection valve 411 that controls the inflow of brake fluid to the wheel cylinder or caliper for braking the front right wheel FR, and the first wheel injection valve 412 that controls the inflow of brake fluid to the wheel cylinder or caliper for braking the rear left wheel RL.

The second brake circuit 420 is provided to brake other wheels FL and RR of the plurality of wheels 200.

For example, the second brake circuit 420 includes second wheel injection valves 421 and 422 that control an inflow of brake fluid to wheel cylinders or calipers for braking the front left wheel (FL) and the rear right wheel (RR), respectively. That is, the second brake circuit 420 may include the second wheel injection valve 421 that controls the inflow of brake fluid to the wheel cylinder or caliper for braking the front left wheel FL, and the second wheel injection valve 422 that controls the inflow of brake fluid to the wheel cylinder or caliper for braking the rear right wheel RR.

The control device 700 may receive the detected information from the level sensor 780 and the braking state detection means 910 and control operations of the first wheel injection valves 411 and 412 of the first brake circuit 410 and the second wheel injection valves 421 and 422 of the second brake circuit 420 to diagnose whether the brake fluid is leaking and the position of the leakage.

Specifically, the control device 700 may diagnose whether the brake fluid stored in the storage tank 800 is leaking and the position of the leakage when the level of the brake fluid decreases below a reference level and the state of the vehicle is detected as the non-braking state. Here, the reference level may vary depending on a capacity and shape of the storage tank 800 and performance and specifications of the hydraulic brake. Further, the control device 700 monitors the amount of outflow of the brake fluid by closing the first wheel injection valves 411 and 412 and generating a predetermined brake pressure in the second brake circuit 420, or by closing the second wheel injection valves 421 and 422 and generating a predetermined brake pressure in the first brake circuit 410, in order to diagnose whether the brake fluid is leaking and the position of the leakage. Here, the predetermined brake pressure may be generated in a small amount without affecting the driver's control of the vehicle. For example, the predetermined brake pressure may be generated such that a decelerating speed per second of the vehicle is less than 0.1 km/h.

The control device 700 may monitor the amount of outflow of the brake fluid for the first brake circuit 410 and sequentially monitor the amount of outflow of the brake fluid for the second brake circuit 420, or conversely, monitor the amount of outflow of the brake fluid for the second brake circuit 420 and sequentially monitor the amount of outflow of the brake fluid for the first brake circuit 410.

As described above, the control device 700 may shut off a supply of the brake fluid to the first brake circuit 410 and generate a predetermined brake pressure in the second brake circuit 420 to monitor the amount of outflow of the brake fluid, and when the amount of outflow of the brake fluid is greater than or equal to a predetermined reference amount, the control device 700 may diagnose that there is a leakage in the second brake circuit 420.

The control device 700 may shut off a supply of the brake fluid to the first brake circuit 410 and generate a predetermined brake pressure in the second brake circuit 420 to monitor the amount of outflow of the brake fluid, and when the amount of outflow of the brake fluid is less than a predetermined reference amount, an outflow rate of the brake fluid from the second brake circuit 420 may be compared to an outflow rate of the brake fluid from the first brake circuit 410. In this case, in considering that the outflow rate of the brake fluid from the first brake circuit 410 is normal, and when the outflow rate of the brake fluid from the second brake circuit 420 is greater than the outflow rate of the brake fluid from the first brake circuit 410, it may be diagnosed that a leakage has occurred in the second brake circuit 420.

The control device 700 may shut off a supply of the brake fluid to the second brake circuit 420 and generate a predetermined brake pressure in the first brake circuit 410 to monitor the amount of outflow of the brake fluid, and when the amount of outflow of the brake fluid is greater than or equal to a predetermined reference amount, the control device 700 may diagnose that there is a leakage in the first brake circuit 410.

The control device 700 may shut off a supply of the brake fluid to the second brake circuit 420 and generate a predetermined brake pressure in the first brake circuit 410 to monitor the amount of outflow of the brake fluid, and when the amount of outflow of the brake fluid is less than a predetermined reference amount, an outflow rate of the brake fluid from the first brake circuit 410 may be compared to an outflow rate of the brake fluid from the second brake circuit 420. In this case, in considering that the outflow rate of the brake fluid from the second brake circuit 420 is normal, and when the outflow rate of the brake fluid from the first brake circuit 410 is greater than the outflow rate of the brake fluid from the second brake circuit 420, it may be diagnosed that a leakage has occurred in the first brake circuit 410.

By the configuration as described above, the system 101 for detecting a brake fluid leakage according to an embodiment of the present disclosure may effectively detect whether there is a small brake fluid leakage and the position of the leakage in the non-braking state of the vehicle.

Therefore, even a small brake fluid leakage may be detected in the non-braking state of the vehicle, and the loss of braking force during braking may be prevented.

Figure 2:
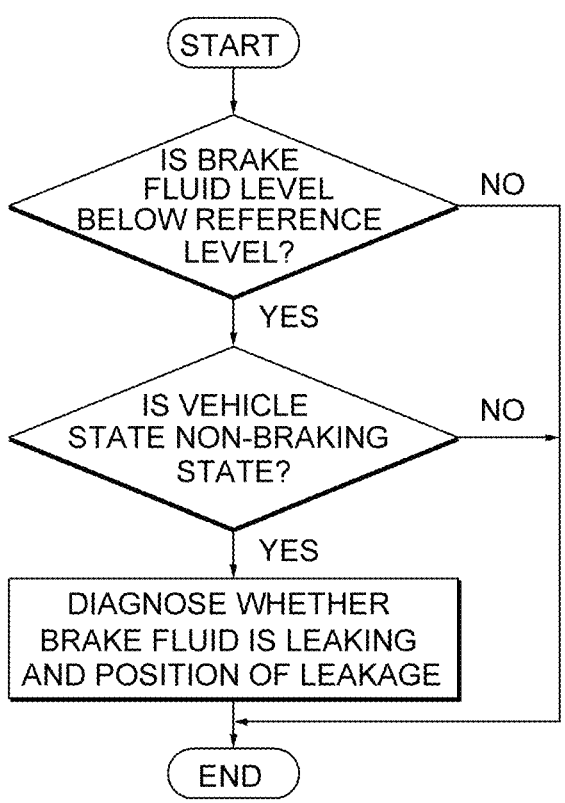
FIGS. 2 to 4 are flowcharts illustrating a method of detecting a brake fluid leakage according to an embodiment of the present disclosure.
Figure 3:
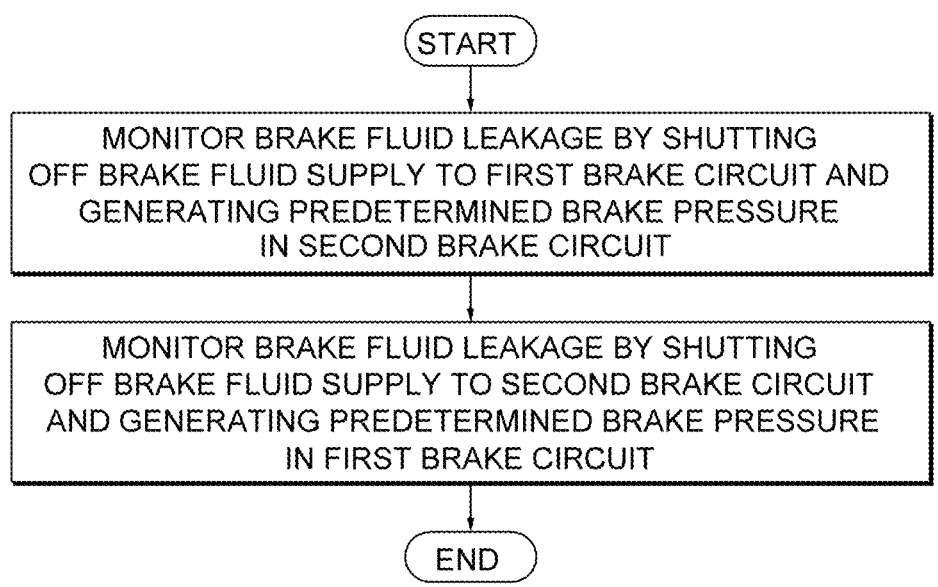
Figure 4:
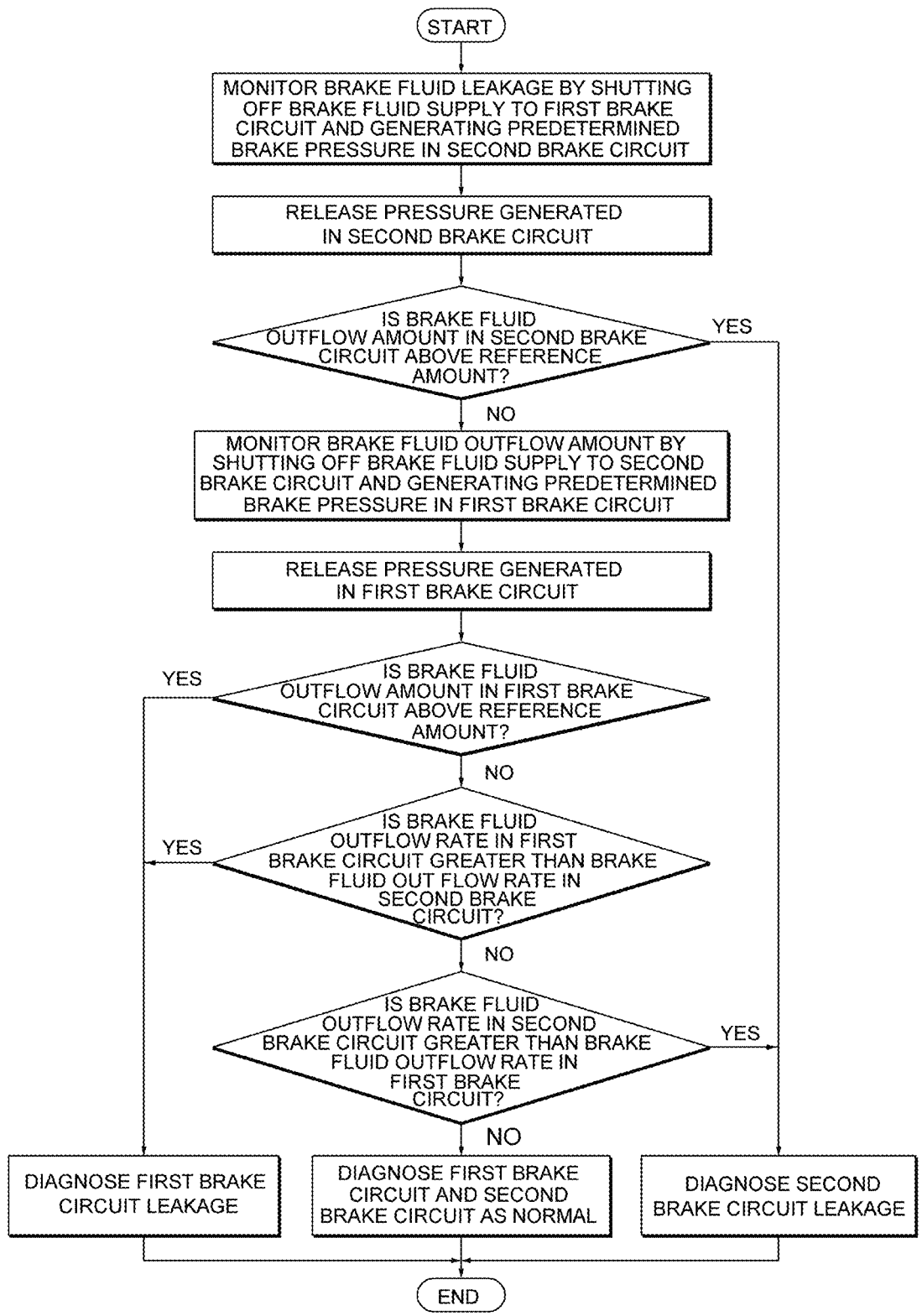

Hereinafter, with reference to FIGS. 2 to 4, a method of detecting a brake fluid leakage will be described according to an embodiment of the present disclosure. FIG. 2 is a flowchart illustrating a basic concept of a method of detecting a brake fluid leakage according to an embodiment of the present disclosure. FIG. 3 is a flowchart illustrating a basic concept for diagnosing whether brake fluid is leaking and a position of the leakage in FIG. 2. FIG. 4 is a flowchart exemplarily illustrating a specific method of diagnosing whether brake fluid is leaking and the position of the leakage in FIG. 2.

As illustrated in FIGS. 2 and 3, a method of detecting a brake fluid leakage according to an embodiment of the present disclosure first detects whether the vehicle is braking and the level of the storage tank 800 (illustrated in FIG. 1) in which the brake fluid is stored in order to detect whether the brake fluid used to generate hydraulic pressure in the hydraulic brake is leaking and the position of the leakage.

As a result of detecting the level of the brake fluid and whether the vehicle is braking, when the level of the brake fluid falls below the reference level and the vehicle is detected to be in the non-braking state, whether the brake fluid is leaking and the position of the leakage is diagnosed. Here, the reference level may vary depending on a capacity and shape of the storage tank and performance and specifications of the hydraulic brake.

There are many ways to detect whether the vehicle is braking.

For example, whether the vehicle is braking may be detected by the amount of depression of the accelerator pedal. That is, when the amount of depression of the accelerator pedal exceeds the predetermined ratio, the state of the vehicle may be determined to be the non-braking state. Here, the predetermined ratio may be 3%, for example.

In another example, whether the vehicle is braking may be detected by the distance by which the brake pedal is depressed. That is, when the distance by which the brake pedal is depressed is less than the predetermined distance, the state of the vehicle may be determined to be the non-braking state. Here, the predetermined distance may be 3 mm, for example.

In another example, whether the vehicle is braking may be detected through the speed of the vehicle. That is, when the speed of the vehicle exceeds a predetermined speed, the state of the vehicle may be determined as the non-braking state. Here, the predetermined speed may be 60 km/h, for example.

A diagnosis of whether the brake fluid is leaking and the position of the leakage includes: monitoring the amount of outflow of the brake fluid by shutting off the supply of the brake fluid to the first brake circuit 410 for braking some of wheels FR and RL of the plurality of wheels 200 and generating a predetermined brake pressure in the second brake circuit 420 for braking the other wheels FL and RR of the plurality of wheels 200; monitoring the amount of outflow of the brake fluid by shutting off the supply of the brake fluid to the second brake circuit 420 for braking the other wheels FL and RR of the plurality of wheels 200 and generating a predetermined brake pressure in the first brake circuit 410 for braking some of wheels FR and RL of the plurality of wheels 200, and diagnosing whether the brake fluid is leaking and the position of the leakage by analyzing results of the monitoring of the amount of outflow of the brake fluid.

Here, the predetermined brake pressure may be generated in a small amount without affecting the driver's control of the vehicle. For example, the predetermined brake pressure may be generated such that a decelerating speed per second of the vehicle is less than 0.1 km/h.

The diagnosis of whether the brake fluid is leaking and the position of the leakage may monitor the amount of outflow of the brake fluid for the first brake circuit 410 and sequentially monitor the amount of outflow of the brake fluid for the second brake circuit 420, or conversely, monitor the amount of outflow of the brake fluid for the second brake circuit 420 and sequentially monitor the amount of outflow of the brake fluid for the first brake circuit 410.

Hereinafter, with reference to FIG. 4, a detailed method of diagnosing whether the brake fluid is leaking and the position of the leakage will be exemplarily described according to an embodiment of the present disclosure.

First, the amount of outflow of the brake fluid is monitored by shutting off the supply of the brake fluid to the first brake circuit 410 and generating a predetermined brake pressure in the second brake circuit 420. For example, the predetermined brake pressure may be generated such that a decelerating speed per second of the vehicle is less than 0.1 km/h, and a monitoring time may be 5 seconds. However, the predetermined brake pressure and the monitoring time are not limited to the descriptions above, and may be changed in various ways as needed. Then, pressure generated in the second brake circuit 420 is released, and the amount of outflow of the brake fluid is identified, and when the amount of outflow of the brake fluid is greater than or equal to the predetermined threshold amount, a diagnosis is made that a leakage has occurred in the second brake circuit 420.

Next, the amount of outflow of the brake fluid is monitored by shutting off the supply of the brake fluid to the second brake circuit 420 and generating a predetermined brake pressure in the first brake circuit 410. Then, pressure generated in the first brake circuit 410 is released, and the amount of outflow of the brake fluid is identified, and when the amount of outflow of the brake fluid is greater than or equal to the predetermined threshold amount, a diagnosis is made that a leakage has occurred in the first brake circuit 410.

The control device 700 may shut off a supply of the brake fluid to the second brake circuit 420 and generate a predetermined brake pressure in the first brake circuit 410 to monitor the amount of outflow of the brake fluid, and when the amount of outflow of the brake fluid is less than a predetermined reference amount, an outflow rate of the brake fluid from the first brake circuit 410 is compared to an outflow rate of the brake fluid from the second brake circuit 420. In this case, in considering that the outflow rate of the brake fluid from the second brake circuit 420 is normal, and when the outflow rate of the brake fluid from the first brake circuit 410 is greater than the outflow rate of the brake fluid from the second brake circuit 420, a diagnosis is made that a leakage has occurred in the first brake circuit 410.

The supply of the brake fluid to the first brake circuit 410 is shut off and a predetermined brake pressure in the second brake circuit 420 is generated to monitor the amount of outflow of the brake fluid, and when the amount of outflow of the brake fluid is less than a predetermined reference amount, an outflow rate of the brake fluid from the second brake circuit 420 is compared to an outflow rate of the brake fluid from the first brake circuit 410. In this case, in considering that the outflow rate of the brake fluid from the first brake circuit 410 is normal, and when the outflow rate of the brake fluid from the second brake circuit 420 is greater than the outflow rate of the brake fluid from the first brake circuit 410, a diagnosis is made that a leakage has occurred in the second brake circuit 420.

In contrast, when the brake fluid outflow rate of the first brake circuit 410 and the brake fluid outflow rate of the second brake circuit 420 are the same, a state of leakage of the brake fluid is diagnosed to be normal.

Meanwhile, the method of detecting a brake fluid leakage as described above is only an illustrative example, and the process of comparing the brake fluid outflow rate of the first brake circuit 410 with the brake fluid outflow rate of the second brake circuit 420 may optionally be omitted to simplify the method of diagnosing whether the brake fluid is leaking and the position of the leakage.

In this case, by performing the method of detecting a brake fluid leakage only in the order illustrated previously in FIGS. 2 and 3, when the amount of outflow of the brake fluid is less than the predetermined reference amount as a result of monitoring the amount of outflow of the brake fluid by shutting off the supply of the brake fluid to the second brake circuit 420 and generating a predetermined brake pressure in the first brake circuit 410, and the amount of outflow of the brake fluid is less than the predetermined reference amount as a result of monitoring the amount of outflow of the brake fluid by shutting off the supply of the brake fluid to the first brake circuit 410 and generating a predetermined brake pressure in the second brake circuit 420, a diagnosis is made that a state of the brake fluid leakage is normal.

By the method as described above, the method of detecting a brake fluid leakage according to an embodiment of the present disclosure may effectively detect whether there is a small brake fluid leakage and the position of the leakage in the non-braking state of the vehicle.

Therefore, even a small brake fluid leakage may be detected in the non-braking state of the vehicle, and the loss of braking force during braking may be prevented.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for detecting a brake fluid leakage in a vehicle and a position of the leakage, the system comprising:
   a storage tank configured to store brake fluid;
   a level sensor configured to detect a level of the brake fluid stored in the storage tank;
   a braking state detection means configured to detect whether the vehicle is braking;
   a first brake circuit provided to brake some of a plurality of wheels, and comprising a first wheel injection valve to control an inflow of the brake fluid;
   a second brake circuit provided to brake wheels of the plurality of wheels, and comprising a second wheel injection valve to control an inflow of the brake fluid; and
   a control device configured to detect whether the brake fluid is leaking and the position of the leakage by closing the first wheel injection valve and generating a predetermined brake pressure in the second brake circuit to monitor an amount of outflow of the brake fluid, or by closing the second wheel injection valve and generating a predetermined brake pressure in the first brake circuit to monitor the amount of outflow of the brake fluid when the level of the brake fluid stored in the storage tank falls below a reference level, and a state of the vehicle is detected as a non-braking state.

2. The system of claim 1, wherein the predetermined brake pressure is generated in a small amount in a range that does not affect an operation of the vehicle by a driver.

3. The system of claim 1, wherein the braking state detection means detects an amount of depression of an accelerator pedal, and
   wherein the control device determines the state of the vehicle as the non-braking state when the amount of depression of the accelerator pedal exceeds a predetermined ratio.

4. The system of claim 1, wherein the braking state detection means detects a distance by which a brake pedal is depressed, and
   wherein the control device determines that the vehicle is in the non-braking state when the distance that the brake pedal is depressed is less than a predetermined distance.

5. The system of claim 1, wherein the braking state detection means detects a speed of the vehicle, and
   wherein the control device determines that the vehicle is in the non-braking state when the speed of the vehicle exceeds a predetermined speed.

6. The system of claim 1, wherein the control device monitors the amount of outflow of the brake fluid for the first brake circuit and sequentially monitors the amount of outflow of the brake fluid for the second brake circuit, or, conversely, monitors the amount of outflow of the brake fluid for the second brake circuit and sequentially monitors the amount of outflow of the brake fluid for the first brake circuit.

7. The system of claim 1, wherein the control device shuts off a supply of the brake fluid to the first brake circuit and generates a predetermined brake pressure in the second brake circuit to monitor the amount of outflow of the brake fluid, and diagnoses that a leakage has occurred in the second brake circuit when the amount of outflow of the brake fluid is above a predetermined reference amount.

8. The system of claim 7, wherein the control device monitors the amount of outflow of the brake fluid by shutting off the supply of the brake fluid to the first brake circuit and generating a predetermined brake pressure in the second brake circuit, when the amount of outflow of the brake fluid is less than a predetermined reference amount, compares a brake fluid outflow rate of the second brake circuit with a brake fluid outflow rate of the first brake circuit, considers that the brake fluid outflow rate in the first brake circuit is normal, and when the brake fluid outflow rate of the second brake circuit is greater than the brake fluid outflow rate of the first brake circuit, diagnoses that a leakage has occurred in the second brake circuit.

9. The system of claim 1, wherein the control device shuts off a supply of the brake fluid to the second brake circuit and generates a predetermined brake pressure in the first brake circuit to monitor the amount of outflow of the brake fluid, and diagnoses that a leakage has occurred in the first brake circuit when the amount of outflow of the brake fluid is above a predetermined reference amount.

10. The system of claim 9, wherein the control device monitors the amount of outflow of the brake fluid by shutting off the supply of the brake fluid to the second brake circuit and generating a predetermined brake pressure in the first brake circuit, when the amount of outflow of the brake fluid is less than a predetermined reference amount, compares a brake fluid outflow rate of the first brake circuit with a brake fluid outflow rate of the second brake circuit, considers that the brake fluid outflow rate in the second brake circuit is normal, and when the brake fluid outflow rate of the first brake circuit is greater than the brake fluid outflow rate of the second brake circuit, diagnoses that a leakage has occurred in the first brake circuit.

11. A method of detecting a brake fluid leakage comprising:
    detecting a level of brake fluid stored;
    detecting whether a vehicle is braking; and
    diagnosing whether the brake fluid is leaking and a position of the leakage when the level of the brake fluid falls below a reference level and a state of the vehicle is detected to be a non-braking state,
    wherein the diagnosing of whether the brake fluid is leaking and the position of the leakage comprises:
    monitoring an amount of outflow of the brake fluid by shutting off a supply of the brake fluid to a first brake circuit for braking some of wheels of a plurality of wheels, and generating a predetermined brake pressure in the second brake circuit for braking the other wheels of the plurality of wheels;
    monitoring the amount of outflow of the brake fluid by shutting off a supply of the brake fluid to the second brake circuit for braking the other wheels of the plurality of wheels, and generating a predetermined brake pressure in the first brake circuit for braking some of wheels of the plurality of wheels; and diagnosing whether the brake fluid is leaking and the position of the leakage by analyzing results of the monitoring of the amount of outflow of the brake fluid.

12. The method of claim 11, wherein the predetermined brake pressure is generated in a small amount in a range that does not affect an operation of the vehicle by a driver.

13. The method of claim 11, wherein whether the vehicle is braking is determined by an amount of depression of an accelerator pedal, and wherein a state of the vehicle is determined as a non-braking state when the amount of depression of the accelerator pedal exceeds a predetermined ratio.

14. The method of claim 11, wherein whether the vehicle is braking is determined by a distance by which a brake pedal is depressed, and wherein a state of the vehicle is determined as a non-braking state when the distance by which the brake pedal is depressed is less than a predetermined distance.

15. The method of claim 11, wherein whether the vehicle is braking is determined by a speed of the vehicle, and wherein a state of the vehicle is determined as a non-braking state when the speed of the vehicle exceeds a predetermined speed.

16. The method of claim 11, wherein the amount of outflow of the brake fluid for the first brake circuit is monitored and the amount of outflow of the brake fluid for the second brake circuit is sequentially monitored, or, conversely, the amount of outflow of the brake fluid for the second brake circuit is monitored and the amount of outflow of the brake fluid for the first brake circuit is sequentially monitored.

17. The method of claim 11, wherein a supply of the brake fluid to the first brake circuit is shut off and a predetermined brake pressure in the second brake circuit is generated to monitor the amount of outflow of the brake fluid, and when the amount of outflow of the brake fluid is above a predetermined reference amount, a diagnosis is made that a leakage has occurred in the second brake circuit.

18. The method of claim 17, wherein the amount of outflow of the brake fluid is monitored by shutting off the supply of the brake fluid to the first brake circuit and generating a predetermined brake pressure in the second brake circuit, when the amount of outflow of the brake fluid is less than a predetermined reference amount, a brake fluid outflow rate of the second brake circuit is compared with a brake fluid outflow rate of the first brake circuit, the brake fluid outflow rate in the first brake circuit is considered as normal, and when the brake fluid outflow rate of the second brake circuit is greater than the brake fluid outflow rate of the first brake circuit, a diagnosis is made that a leakage has occurred in the second brake circuit.

19. The method of claim 11, wherein a supply of the brake fluid to the second brake circuit is shut off and a predetermined brake pressure in the first brake circuit is generated to monitor the amount of outflow of the brake fluid, and when the amount of outflow of the brake fluid is above a predetermined reference amount, a diagnosis is made that a leakage has occurred in the first brake circuit.

20. The method of claim 19, wherein the amount of outflow of the brake fluid is monitored by shutting off the supply of the brake fluid to the second brake circuit and generating a predetermined brake pressure in the first brake circuit, when the amount of outflow of the brake fluid is less than a predetermined reference amount, a brake fluid outflow rate of the first brake circuit is compared with a brake fluid outflow rate of the second brake circuit, the brake fluid outflow rate in the second brake circuit is considered as normal, and when the brake fluid outflow rate of the first brake circuit is greater than the brake fluid outflow rate of the second brake circuit, a diagnoses is made that a leakage has occurred in the first brake circuit.

\* \* \* \* \*